(12) United States Patent
Wendt

(10) Patent No.: US 11,151,829 B2
(45) Date of Patent: Oct. 19, 2021

(54) EXTENDED CONVOLUTIONAL NEURAL NETWORK FOR DOCUMENT ANALYSIS

(71) Applicant: IDEMIA Identity & Security Germany AG, Bochum (DE)

(72) Inventor: Norbert Wendt, Essen (DE)

(73) Assignee: IDEMIA Identity & Security Germany AG, Bochum (DE)

(*) Notice: Subject to any disclaimer, the term of this patent is extended or adjusted under 35 U.S.C. 154(b) by 0 days.

(21) Appl. No.: 16/421,041

(22) Filed: May 23, 2019

(65) Prior Publication Data

US 2019/0362580 A1 Nov. 28, 2019

(30) Foreign Application Priority Data

May 23, 2018 (EP) .................................. 18173797

(51) Int. Cl.
*G05B 19/00* (2006.01)
*G07D 7/004* (2016.01)
(Continued)

(52) U.S. Cl.
CPC ............. *G07D 7/004* (2013.01); *G01N 21/01* (2013.01); *G06F 40/30* (2020.01); *G06K 9/2054* (2013.01);
(Continued)

(58) Field of Classification Search
CPC ...... G07D 7/004; G07D 7/0054; G07D 7/205; G06F 40/30; G01N 21/01;
(Continued)

(56) References Cited

U.S. PATENT DOCUMENTS 9,501,724 B1* 11/2016 Yang .......................... G06T 3/40
2003/0099379 A1    5/2003 Monk et al.
(Continued)

OTHER PUBLICATIONS

Ji Lee et al: "A Survey on Banknote Recognition Methods by Various Sensors", Sensors, vol. 17, No. 2, Feb. 8, 2017 (Feb. 8, 2017), p. 313, XP055463418, DOI: 10.3390/s17020313 *the whole document*.

(Continued)

*Primary Examiner* — Zhen Y Wu
(74) *Attorney, Agent, or Firm* — Moore & Van Allen PLLC; Henry B. Ward, III

(57) ABSTRACT

The invention refers to a computer-implemented method of analyzing security documents having visible information and at least one of infrared and ultraviolet detectable information, the method comprising the steps of: receiving visible-color data of a first set of pixels of a first region of the security document in a first image of the security document and feeding the visible-color data to a convolutional neural network, CNN; receiving infrared, IR, and/or ultraviolet, UV, data of a second and/or third set of pixels of a respective second and/or third region in a respective second and/or third image of the security document and feeding the IR and/or UV data to the CNN; analyzing the visible-color data of the first set of pixels using the CNN to extract characteristics of the security document from the visible information; and analyzing the IR and/or UV data of the second and/or third set of pixels using the CNN to extract characteristics of the security document from the IR and/or UV information. Further, a corresponding system is provided.

19 Claims, 3 Drawing Sheets

(51) Int. Cl.

| | |
|---|---|
| *G07D 7/005* | (2016.01) |
| *G01N 21/01* | (2006.01) |
| *G06K 9/20* | (2006.01) |
| *G06N 3/04* | (2006.01) |
| *G06N 3/08* | (2006.01) |
| *G07D 7/202* | (2016.01) |
| *G06F 40/30* | (2020.01) |

(52) U.S. Cl.
CPC .............. *G06N 3/04* (2013.01); *G06N 3/08* (2013.01); *G07D 7/0054* (2017.05); *G07D 7/205* (2013.01); *G01N 2021/0106* (2013.01); *G06K 2209/01* (2013.01)

(58) Field of Classification Search
CPC ......... G01N 2021/0106; G06K 9/2054; G06K 2209/01; G06N 3/04; G06N 3/08
USPC ........................................................ 340/5.86
See application file for complete search history.

(56) References Cited

U.S. PATENT DOCUMENTS

| | | | | |
|---|---|---|---|---|
| 2005/0259866 | A1* | 11/2005 | Jacobs | G06K 9/00463 382/157 |
| 2011/0128360 | A1* | 6/2011 | Hatzav | G06K 9/00469 348/61 |
| 2015/0063655 | A1* | 3/2015 | Poder | G06T 1/005 382/116 |
| 2016/0180195 | A1* | 6/2016 | Martinson | G06K 9/6202 382/103 |
| 2016/0364936 | A1* | 12/2016 | Gao | H04N 5/33 |
| 2017/0351909 | A1* | 12/2017 | Kaehler | G06K 9/00456 |
| 2018/0108101 | A1* | 4/2018 | Rodriguez | G06K 19/06028 |
| 2018/0336672 | A1* | 11/2018 | Perticone | G08B 13/189 |
| 2019/0102873 | A1* | 4/2019 | Wang | G06K 9/54 |
| 2019/0114743 | A1* | 4/2019 | Lund | G06N 3/0454 |
| 2019/0213408 | A1* | 7/2019 | Cali | G06K 9/00456 |
| 2019/0220660 | A1* | 7/2019 | Cali | G06K 9/00442 |
| 2019/0251774 | A1* | 8/2019 | Azanza Ladron | G06T 7/97 |
| 2019/0340760 | A1* | 11/2019 | Swank | G06T 7/0012 |
| 2019/0354791 | A1* | 11/2019 | Goubalan | G06K 9/4638 |
| 2019/0362580 | A1* | 11/2019 | Wendt | G06K 9/00899 |
| 2020/0274997 | A1* | 8/2020 | Elvira | H05B 47/125 |
| 2020/0410657 | A1* | 12/2020 | Horii | G06N 3/0454 |

OTHER PUBLICATIONS

Centeno Albert Berenguel et al: "E-Counterfeit: A Mobile-Server Platform for Document Counterfeit Detection", 2017 14th IAPR International Conference on Document Analysis and Recognition (ICDAR), IEEE, vol. 9, Nov. 9, 2017 (Nov. 9, 2017), pp. 15-20, XP033307485, DOI: 10.1109/ICDAR.2017.390 [retrieved on Jan. 25, 2018] *the whole document*.

Wu Ancong et al: "RGB-Infrarad Cross-Modality Person Re-identification", 2017 IEEE International Conference on Computer Vision (ICCV), IEEE, Oct. 22, 2017 (Oct. 22, 2017), pp. 5390-5399, XP033283418, DOI: 10.1109/ICCV.2017.575 [retrieved on Dec. 22, 2017] *the whole document*.

European Search Report issued for corresponding European Patent Application No. EP18173797.4 dated Oct. 30, 2018.

* cited by examiner

EXTENDED CONVOLUTIONAL NEURAL NETWORK FOR DOCUMENT ANALYSIS

FIELD OF THE INVENTION

The invention refers to a computer-implemented method of analyzing security documents.

PRIOR ART

A convolutional neural network (CNN) is a specific class of deep, feed-forward networks. A CNN consists of an input and an output layer, as well as multiple hidden layers. The hidden layers of a CNN usually include convolutional layers, pooling layers, fully connected layers and normalization layers. Mathematically the (by convention called) convolution corresponds to a cross-correlation. Convolutional layers perform a convolution operation on the input and pass the result to the next layer. The convolution emulates the response of an individual neuron. Each convolutional neuron processes data only for its usually limited field of reception. It is not practical to apply fully connected networks to images since a very high number of neurons would be necessary because of the very large input sizes associated with images, each pixel being a relevant variable. The convolution operation reduces the number of free parameters such that the network may be deeper with fewer parameters. As such a CNN is an artificial neural network which work by sliding windows through its input to look for local features and are suitable for processing two-dimensional data, in particular, they proved to work very well for image recognition tasks.

Local or global pooling layers combine outputs of neuron clusters of one layer to a single neuron in the next layer, in a non-linear down-sampling process. For example, max pooling uses the maximum value from each of a cluster of neurons at the previous layer. The pooling layer serves to progressively reduce the spatial size of the representation, to reduce the number of parameters and amount of computation in the network. It is common to periodically insert a pooling layer between successive convolutional layers in a CNN architecture. CNNs can be trained with standard back propagation. CNNs are easier to train than other regular, deep, feed-forward neural networks as there is a reduced set of parameters to be estimated.

Fully connected layers in CNNs connect every neuron in one layer to every neuron in another layer. Further, CNNs share weights in convolutional layers, which means that the same filter is used for each receptive field in the layer, which reduces memory requirements and improves performance.

The convolutional layers are the central elements of a CNN. The parameters of these layers consist of a set of learnable filters, which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Finally, after several convolutional and max pooling layers, the high-level reasoning in the neural network is done via fully connected layers. Neurons in a fully connected layer have connections to all activations in the previous layer, as seen in regular neural networks. Their activations can hence be computed with a matrix multiplication followed by a bias offset.

For image processing tasks RGB data serve as input for the CNNs, each color R, G, and B of a specific pixel of an image being the input of a respective neuron of a CNN, in order to extract features of the image.

DESCRIPTION OF THE INVENTION

The invention has been made to provide additional information and/or improved information extraction when analyzing documents that comprise security elements responsive to infrared and/or ultraviolet light. Such documents are called security documents in the following and include for example passports, ID cards and banknotes.

The invention provides a method according to claim 1.

Claim 1 is directed to a computer-implemented method of analyzing security documents having visible information and at least one of infrared and ultraviolet detectable information, the method comprising the steps of:

receiving visible-color data of a first set of pixels of a first region of the security document in a first image of the security document and feeding the visible-color data to a convolutional neural network, CNN;

receiving infrared, IR, and/or ultraviolet, UV, data of a second and/or third set of pixels of a respective second and/or third region in a respective second and/or third image of the security document and feeding the IR and/or UV data to the CNN;

analyzing the visible-color data of the first set of pixels using the CNN to extract characteristics of the security document from the visible information; and analyzing the IR and/or UV data of the second and/or third set of pixels using the CNN to extract characteristics of the security document from the IR and/or UV information.

The advantage of the method according to the invention is that security checks can be performed with respect to the security document in IR and/UV in addition to checks based on the visual analysis of the document with the CNN. According to the prior art, the CNN was only used for extracting features of the security document based on RGB data. By adding the IR and/or UV data as additional input layers of the CNN, for example, an extension of the CNN is provided that implements an extended automated optical analysis of the security document.

The method according to the invention can be developed in that the visible-color data include three components and are fed to the CNN as respective first to third neurons for each pixel, and wherein the IR and or UV data are fed to the CNN as a fourth and/or a fifth neuron, respectively, for each pixel. This provides for a convenient way to extend the CNN.

The visible-color data may be RGB or HSL or HSV color data. This allows for use of image data from a standard imaging device and related imaging software.

According to another development, the first and second and/or third region of the security document are overlapping, in particular the first and second and/or third region of the security document may be the same region of the security document. Therefore, a particular region of the security document having a specific security element may be analyzed in both, using visible light (e.g. daylight) and IR and/or UV light (e.g. using an IR lamp and/or a UV lamp).

In an alternative development, the first and second and/or third region of the security document are non-overlapping. Thus, security elements that are distinct form each other may be analyzed separately with respect to the optical spectrum. For example, a passport may include a security element that is designed to be rarely or not seen with visible light but only when shining UV light onto it.

The extracted characteristics of the security document from the visible information may be features in an object recognition step. Accordingly, the visual data may be used to perform object recognition, in particular this may involve a face recognition step. Another example would be to perform a text recognition such as OCR in order to extract a passport number or text information in other text fields of a passport.

The extracted characteristics of the security document from the IR and/or UV information may correspond to data in at least one data field of the security document and/or may correspond to the presence or absence of at least one security element of the security document and/or may correspond to at least one tampering evidence of the security document. For example, IR and/or UV light may be used to recognize a hidden security element of a passport (hidden from visual inspection). In particular, it may be determined if the security element has been tampered or is in order. As another example, it may thereby be determined that a banknote is a falsification if such a security characteristic is missing or if it does not have the required properties.

The step of analyzing the IR and/or UV data to extract characteristics of the security document from the IR and/or UV information may include comparing CNN analysis results with predetermined training data. Such training data may be obtained once during a training phase of the CNN in advance.

The security document may specifically be an identity card, a passport, or a banknote.

The invention further provides a system according to claim 10.

Claim 10 is directed to a system for analyzing security documents having visible information and at least one of infrared and ultraviolet detectable information, the system comprising:
- at least one imaging device, in particular a digital camera and/or an image scanner; and
- a computing device having implemented thereon a convolutional neural network, CNN, the computing device configured for:
- receiving visible-color data of a first set of pixels of a first region of the security document in a first image of the security document and feeding the visible-color data to a convolutional neural network, CNN;
- receiving infrared, IR, and/or ultraviolet, UV, data of a second and/or third set of pixels of a respective second and/or third region in a respective second and/or third image of the security document and feeding the IR and/or UV data to the CNN;
- analyzing the visible-color data of the first set of pixels using the CNN to extract characteristics of the security document from the visible information; and
- analyzing the IR and/or UV data of the second and/or third set of pixels using the CNN to extract characteristics of the security document from the IR and/or UV information.

The system according to the invention is configured to perform the method of the invention, such that the above-mentioned advantages apply similarly.

According to a development of the inventive system, it may further comprise a display configured for displaying at least one of the first and second and/or third image of the security document.

The display may be further configured for displaying at least one of characteristics of the security document from the visible information and characteristics of the security document from the IR and/or UV information.

The extracted characteristics of the security document from the IR and/or UV information may correspond to data in at least one data field of the security document and/or may correspond to presence or absence of at least one security element of the security document and/or may correspond to at least one tampering evidence of the security document.

According to another development, the system may be configured to output an alarm, in particular a visual alarm on the display, in case the data in the at least one data field trigger an alarm when compared to data in a database and/or if the at least one security element is absent and/or if the at least one tampering evidence is detected.

The system according to the invention may be used for analyzing an identity card, a passport, or a banknote as the security document.

Additional features and advantages of the present invention will be described with reference to the drawings. In the description, reference is made to the accompanying figures that are meant to illustrate preferred embodiments of the invention. It is understood that such embodiments do not represent the full scope of the invention.

EMBODIMENTS

Various illustrative embodiments of the disclosure are described below. In the interest of clarity, not all features of an actual implementation are described in this specification. It will of course be appreciated that in the development of any such an actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following embodiments are described in sufficient detail to enable those skilled in the art to make use of the disclosure. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

Figure 1:
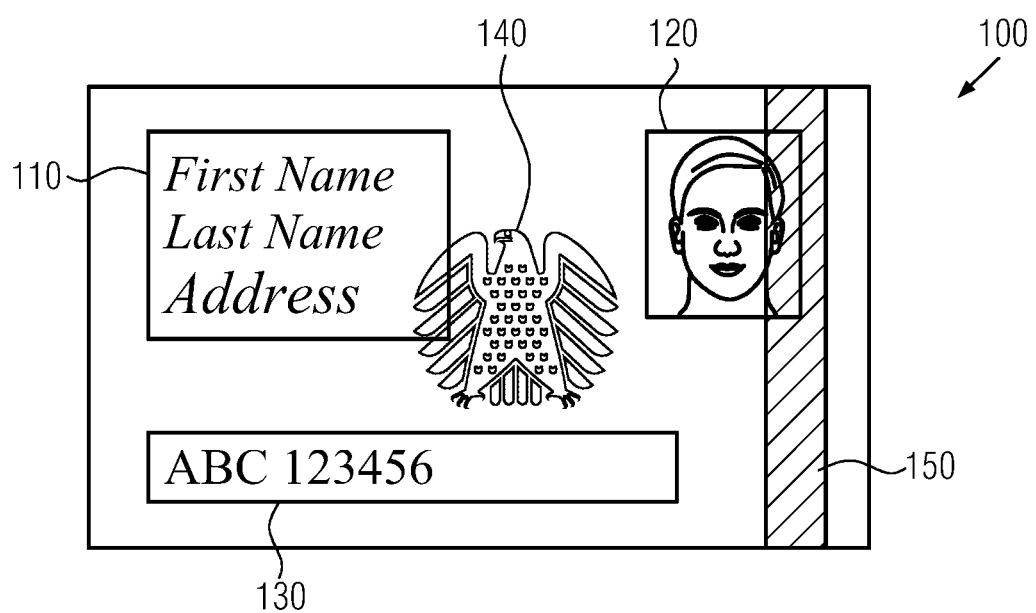
FIG. 1 illustrates an example of a security document.

FIG. 1 illustrates an example of a security document, namely an ID card.

The ID card 100 comprises a field 110 including the name and address of a person, a field 120 including a picture of the person, and a filed 130 including an ID card number. The information in the field 110, 120, 130 is visible information, i.e. when visible light such as daylight illuminates the ID card, this information can be seen by a human or by a digital camera having an RGB image sensor, in particular with a filter in front of the sensor essentially transmitting only RGB colors and filtering light outside of the RGB range.

The ID card 100 further comprises a field 140 that may be highly reflective for infrared (IR) radiation, and in this example is a seal related to the country that issued the ID card. This seal may extend at least partially across other visible fields, such as the name and address field 110. Although the seal may also be slightly visible under daylight, in this example it is designed to be bright when illuminated with IR light. As such the seal field 140 can be seen with a camera being sensible for IR light.

Additionally, in this example the ID card 100 further comprises a field 150 that may be highly reflective for ultraviolet (UV) light. This field is designed as a strip that runs over the picture field 120 and may include a structure (such as a hatching). Although the strip may also be slightly visible under daylight or IR light, it is designed to be bright under UV light, in particular involving materials that are reflective for UV light or fluorescent materials that transfer the UV light into visible light. As such the strip 150 is bright when illuminated with UV light and can be seen by a camera.

Figure 2:
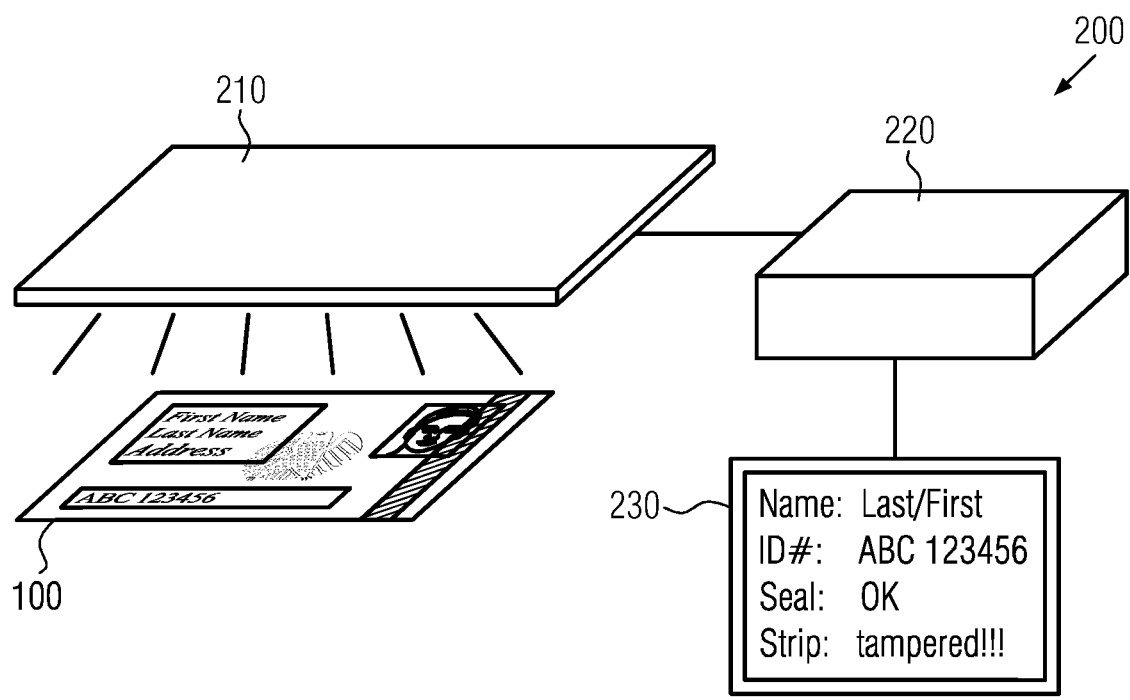
FIG. 2 illustrates a system according to an embodiment of the invention.

FIG. 2 illustrates an embodiment of the system according to the invention.

The system 200 for analyzing a security document 100 as shown in FIG. 1, the document having visible information 110, 120, 130 and infrared detectable information 140 and ultraviolet detectable information 150. The system 200 comprises an image scanner 210 and a computer 220 having implemented thereon a convolutional neural network, CNN. The image scanner 210 illuminates the ID card 100 with visible light, IR light and UV light. The scanner has at least one imaging sensor sensible for visible light. The sensor may also be sensible for IR and/or UV. Alternatively, separate imaging sensor may be provides for IR and/or UV.

The computer 220 receives visible-color data of a first set of pixels of a first region of the ID card 100 in a first image of the security document (for example from the fields 110, 120, 130 of the ID card 100) from the image scanner 210 and provides the visible-color data to a convolutional neural network, CNN. Further, the computer 220 receives the infrared, IR, and ultraviolet, UV, data of a second and third set of pixels of a second region 140 and a third region 150 in a respective second and third image of the ID card 100 and provides the IR and UV data to the CNN.

The computer analyzes the visible-color data of the first set of pixels using the CNN to extract characteristics of the ID card 100 from the visible information and analyzes the IR and UV data of the second and third set of pixels using the CNN to extract characteristics of the ID card 100 from the IR and UV information.

The system 200 further comprises a display 230 for displaying characteristics of the ID card 100 from the visible information and characteristics of the ID card 100 from the IR and UV information. The extracted characteristics of the ID card 100 from the IR and/or UV information may correspond to data in at least one data field 110-130 of the ID card 100 and/or may correspond to presence or absence of at least one security element of the ID card 100 and/or may correspond to at least one tampering evidence of the ID card 100. A tampering may be detected when the extracted characteristic (for example from fields 140, 150) does not correspond to the expected standard characteristic. As an example, the stripe 150 may be only partially present because the ID card was tampered by placing a different picture than the original picture over the field 120.

The display 230 may show characteristics of the ID card such as the last and first as well as the address extracted from the field 110, which may involve OCR technology, an indication that the seal is in conformity with the standard (OK) from the IR data for example, and an indication that the strip 150 is not in conformity with the standard (tampered !!!) from the UV data.

The system 200 may output an alarm, in particular a visual alarm on the display 230, in case the data in the at least one data field trigger an alarm when compared to data in a database and/or if the at least one security element is absent and/or if the at least one tampering evidence is detected. For example, at an airport customer check-in or an immigration booth, the ID card may be checked in the visible, IR and UV range and an alarm may be triggered if a non-conformity with the expected standard is detected.

The computer 220 include a database including training data of different ID cards on which the CNN has been trained in advance.

Figure 3:
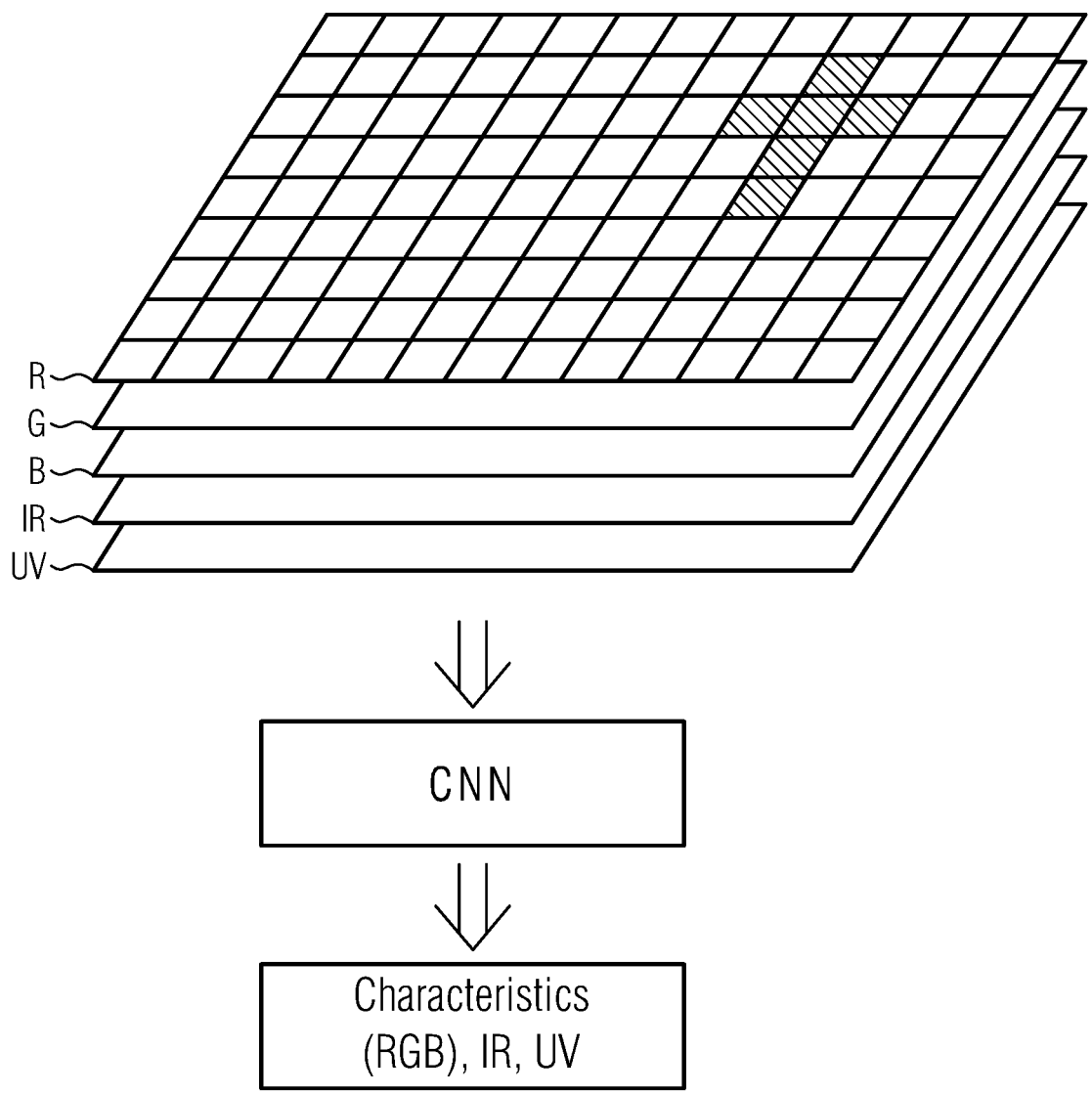
FIG. 3 illustrates a method according to an embodiment of the invention.

FIG. 3 illustrates an embodiment of the method according to the invention.

An embodiment of the method according to the invention is directed to a computer-implemented method of analyzing an ID card having visible information and infrared and ultraviolet detectable information.

The method comprises the steps of receiving visible-color data of a first set of pixels of a first region of the security document in a first image of the security document and feeding the visible-color data to a convolutional neural network, CNN; receiving infrared, IR, and ultraviolet, UV, data of a second and third set of pixels of a respective second and/or third region in a respective second and/or third image of the security document and feeding the IR and UV data to the CNN; analyzing the visible-color data of the first set of pixels using the CNN to extract characteristics of the security document from the visible information; and analyzing the IR and UV data of the second and third set of pixels using the CNN to extract characteristics of the security document from the IR and/or UV information.

According to the prior art, the CNN was only used for extracting features of the security document based on RGB data. For example face recognition may be performed by the computer 220 using features extracted from the picture field 120 of the ID card 100. The present invention maintains this ability, however, by adding the IR and UV data as additional input layers of the CNN, an extension of the CNN is provided that implements an extended automated optical analysis of the security document. The advantage of the method according to the invention is that security checks can be performed with respect to the security document in IR and UV in addition to checks based on the visual analysis of the document with the CNN. In particular, the additional checks using the CNN may relate to fields of the security document (for example ID card) that can only be recognized in IR and/or UV.

The visible-color data include three components and are fed to the CNN as respective first to third neurons for each pixel, and the IR and or UV data are fed to the CNN as a fourth and a fifth neuron, respectively, for each pixel.

As such, the CNN has been expanded to include IR and UV data. The IR and/or UV data may correspond to independent additional information analyzed by the CNN. However, when implementing one or more fully connected layers, characteristics from IR and/or UV data may be related to characteristics extracted from visible data in overlapping regions of the security document.

The embodiments described above are only exemplary and the full scope of the invention is defined by the claims.

The invention claimed is:

1. A computer-implemented method of analyzing security documents having visible information and at least one selected from the group comprising infrared (IR) and ultraviolet (UV) detectable information and at least one overlapping region comprising visible information and at least one selected from the group comprising IR and UV detectable information, the method executed by one or more processing devices and comprising the steps of:
   receiving visible-color data of a first set of pixels of a first region of the security document in a first image of the security document and feeding the visible-color data to a convolutional neural network (CNN) having at least one fully connected layer;
   receiving at least one selected from the group comprising of the IR and UV detectable information of at least one selected from the group comprising a second and a third set of pixels of a respective at least one selected from the group comprising a second and a third region in a respective at least one selected from the group comprising a second and a third image of the security document and feeding the at least one selected from the group comprising the IR and UV detectable information to the CNN;
   analyzing the visible-color data of the first set of pixels using the CNN to extract characteristics of the security document from the visible information; and
   analyzing the at least one selected from the group comprising the IR and the UV detectable information of the at least one selected from the group comprising the second and third set of pixels using the CNN to extract characteristics of the security document from the at least one selected from the group comprising IR and UV detectable information, which is visible using at least one selected from the group comprising IR and UV, but is not visible without using the at least one selected from the group comprising IR and UV, and determining that the extracted characteristics do not correspond to expected characteristics of the IR and UV detectable information in order to identify evidence of tampering with the security document,
   wherein the visible-color data includes three components and is fed to the CNN as respective first to third neurons for each pixel, and wherein the at least one selected from the group comprising the IR and UV detectable information are fed to the CNN as at least one selected from the group comprising a fourth and a fifth neuron, respectively, for each pixel to provide for the CNN to independently analyze the extracted components of the visible data and the extracted characteristics from at least one selected from the group comprising the IR and UV detectable information, and
   wherein the at least one fully connected layer provides for the CNN to inter-relate the extracted characteristics from the visible data within the at least one overlapping region with the extracted characteristics from the at least one selected from the group comprising IR and UV detectable information in the at least one overlapping region.

2. The method according to claim 1, wherein the visible-color data are Red, Green, Blue (RGB) or Hue, Saturation, Luminance (HSL) or Hue, Saturation, Value (HSV) color data.

3. The method according to claim 1, wherein the first region and at least one selected from the group comprising the second region and third region of the security document are overlapping, wherein the first region and at least one selected from the group comprising the second region and third region of the security document are a same region of the security document.

4. The method according to claim 1, wherein the first region and at least one selected from the group comprising the second region and third region of the security document are non-overlapping.

5. The method according to claim 1, wherein the extracted characteristics of the security document from the visible information are features in a face recognition step.

6. The method according to claim 1, wherein the extracted characteristics of the security document from the at least one selected from the group comprising the IR and UV detectable information corresponds to at least one selected from the group comprising (i) data in at least one data field of the security document, (ii) the presence or absence of at least one security element of the security document, and (iii) at least one tampering evidence of the security document.

7. The method according to claim 1, wherein analyzing the at least one selected from the group comprising the IR and and/or UV detectable information_to extract characteristics of the security document from the at least one selected from the group comprising the IR and UV detectable information includes comparing CNN analysis results with predetermined training data.

8. The method according to claim 1, wherein the security document is an identity card, a passport, or a banknote.

9. A system for analyzing security documents having visible information and at least one selected from the group comprising infrared (IR) and ultraviolet (UV) detectable information and at least one overlapping region comprising visible information and at least one selected from the group comprising IR and UV detectable information, the system comprising:
   at least one imaging device comprising at least one selected from the group comprising a digital camera and an image scanner; and
   a computing device having implemented thereon a convolutional neural network (CNN), the computing device configured for:
   receiving visible-color data of a first set of pixels in a first image of the security document from the at least one imaging device, and feeding the visible-color data to the CNN having at least one fully connected layer, wherein the visible-color data includes three components and is fed to the CNN as respective first to third neurons for each pixel;
   receiving at least one selected from the group comprising the IR and UV detectable information of at least one selected from the group comprising a second and a third set of pixels in a respective at least one selected from the group comprising a second and a third image of the security document from the at least one imaging device, and feeding at least one selected from the group comprising the IR and UV detectable information to the CNN, wherein the at least one selected from the group comprising the IR and UV detectable information are fed to the CNN as at least one selected from the group comprising a fourth and a fifth neuron, respectively, for each pixel to provide for the CNN to independently analyze the extracted components of the visible data and the extracted characteristics from at least one selected from the group comprising the IR and UV detectable information;

analyzing the visible-color data of the first set of pixels using the CNN to extract characteristics of the security document from the visible information; and analyzing the at least one selected from the group comprising the IR and UV detectable information of the at least one selected from the group comprising the second and third set of pixels using the CNN to extract characteristics of the security document from the at least one selected from the group comprising the IR and UV detectable information, which is visible using at least one selected from the group comprising IR and UV, but is not visible without using the at least one selected from the group comprising IR and UV, and determining that the extracted characteristics do not correspond to expected characteristics of the IR and UV detectable information in order to identify evidence of tampering with the security document, wherein the at least one fully connected layer provides for the CNN to inter-relate the extracted characteristics from the visible data within the at least one overlapping region with the extracted characteristics from the at least one selected from the group comprising IR and UV detectable information in the at least one overlapping region.

10. The system according to claim 9, further comprising a display configured for displaying at least one of characteristics of the security document from the visible information and characteristics of the security document from the at least one selected from the group comprising IR and UV detectable information.

11. The system according to claim 10, wherein the display is further configured for displaying at least one selected from the group comprising (i) the first image and (ii) at least one selected from the group comprising the second image and third image of the security document.

12. The system according to claim 9, wherein the extracted characteristics of the security document from the at least one selected from the group comprising the IR and UV detectable information corresponds to data in at least one selected from the group comprising (i) a data field of the security document, (ii) presence or absence of at least one security element of the security document, and (iii) at least one tampering evidence of the security document.

13. The system according to claim 12, wherein the system is configured to output an alarm upon occurrence of at least one selected from the group comprising (i) the data in the at least one data field trigger an alarm when compared to data in a database, (ii) if the at least one security element is absent, and (iii) if the at least one tampering evidence is detected.

14. The system according to claim 9, wherein the security document is an identity card, a passport, or a banknote.

15. The system according to claim 9, wherein the visible-color data are Red, Green, Blue (RGB) or Hue, Saturation, Luminance (HSL) or Hue, Saturation, Value (HSV) color data.

16. The system according to claim 9, wherein the first image and at least one selected from the group comprising the second image and third image of the security document are overlapping, wherein the first image and at least one selected from the group comprising the second image and third image of the security document are in a same region of the security document.

17. The system according to claim 15, wherein the first image and at least one selected from the group comprising the second image and third image of the security document are overlapping, wherein the first image and at least one selected from the group comprising the second image and third image of the security document are in a same region of the security document.

18. The system according to claim 9, wherein the first image and at least one selected from the group comprising the second image and third image of the security document are non-overlapping.

19. The method according to claim 2, wherein the first region and at least one selected from the group comprising the second region and third region of the security document are non-overlapping.

* * * * *